May 18, 1965  J. D. HAGUE ETAL  3,184,738
OBSTACLE WARNING COMPUTER
Filed June 30, 1959  2 Sheets-Sheet 1
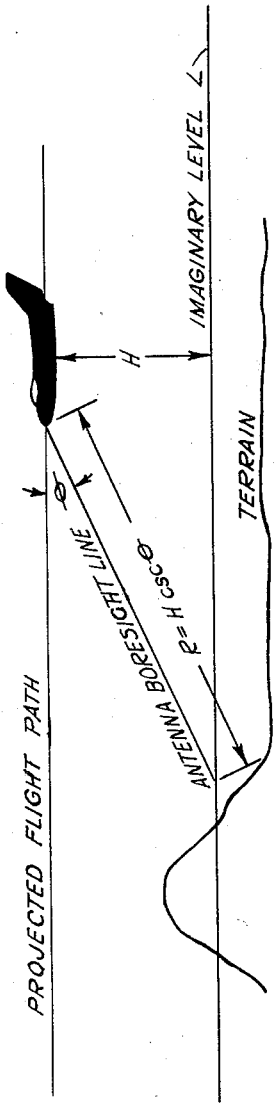
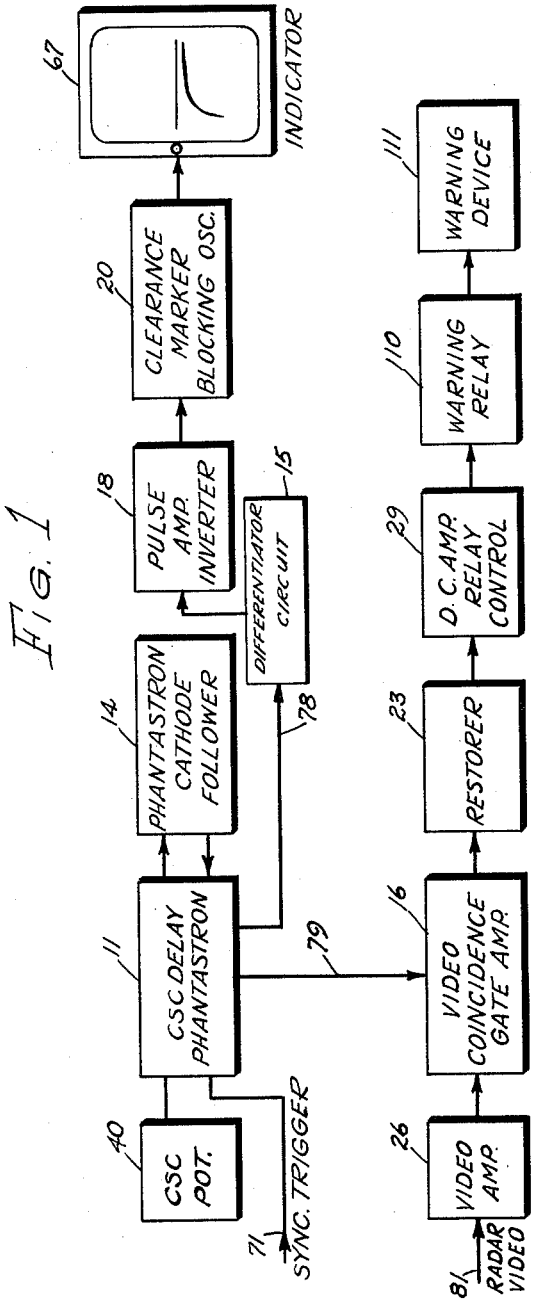
INVENTORS
JOHN D. HAGUE
RICHARD L. LUNDBERG
BY
*H. H. Losche*
ATTORNEYS

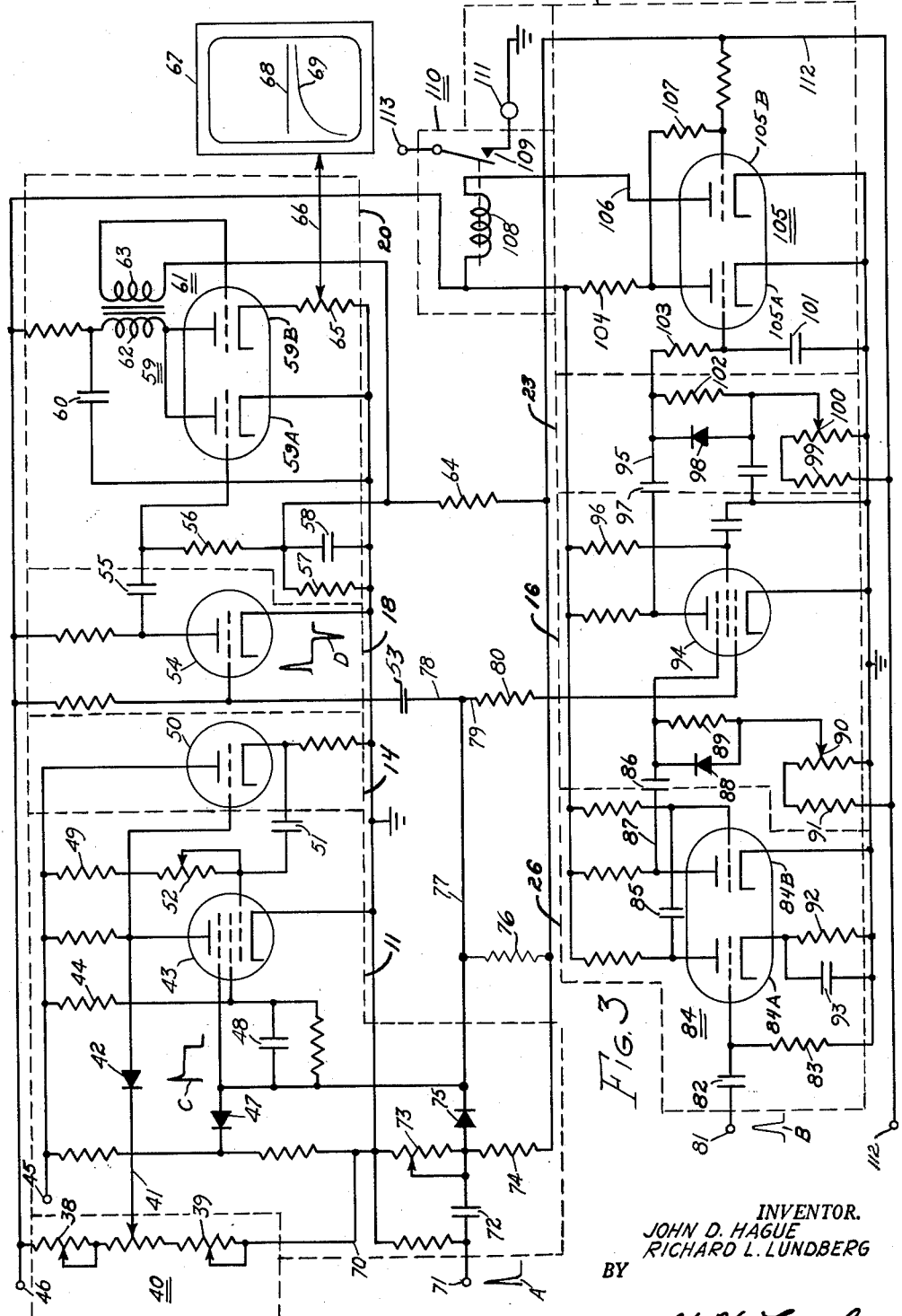

United States Patent Office 3,184,738
Patented May 18, 1965

3,184,738
OBSTACLE WARNING COMPUTER
John D. Hague and Richard L. Lundberg, Indianapolis, Ind., assignors to the United States of America as represented by the Secretary of the Navy
Filed June 30, 1959, Ser. No. 824,139
8 Claims. (Cl. 343—7)
(Granted under Title 35, U.S. Code (1952), sec. 266)

The invention described herein may be manufactured and used by or for the Government of the United States of America for governmental purposes without the payment of any royalties thereon or therefor.

This invention relates generally to obstacle detection means and warning means for aircraft. It relates more specifically to means for producing a signal to the pilot when an obstacle appears in the flight path of the aircraft. It also provides a visual representation of the relationship between the flight path of the aircraft and a selected level parallel to and below the flight path in the direction of the projected flight path.

Under certain conditions of visibility in which aircraft must be operated, there has been a need for auxiliary means to aid the pilot in becoming aware of and recognizing obstacles or irregularities in terrain ahead of his aircraft, particularly in its projected flight path. During the execution of military missions such as those requiring low altitude approaches under adverse or night flying conditions, the need has been particularly great.

In prior known devices for obstacle warning the usual method has been to produce a warning signal whenever the radar beam projected by the aircraft intercepted some obstacle in the beam. Where those devices provided a visual presentation on an oscilloscope, the presentation usually included not only obstacles in the flight path of the aircraft but also all others within the range of the radar and enveloped by the radar beam. Clearly, a means was necessary, which would indicate whether or not an obstacle ahead of the aircraft was actually in the flight path of the aircraft or so close thereto as to constitute a hazard, so that adequate warning could be provided and steps taken in time to avoid the obstacle.

According to the present invention, there is provided circuitry which may be used in conjunction with radar devices which are known in the art, to produce two types of indications so that the pilot will know when obstacles exist in the flight path. One indication is a visual presentation on an oscilloscope, in an "E scope" application, of a "clearance marker" representative of a selected level below the aircraft, designating a clearance channel. The other indication may be either an audible warning signal or a visual warning signal such as a light which is activated when the aircraft is within a certain predetermined range from some obstacle in its flight path.

The circuitry utilizes an input which represents the cosecant of the angle between the flight path of the aircraft and the radar antenna boresight. It also has an input for a video signal obtained from the video circuit of the radar. It has another input for a pulse which is synchronized with the RF pulse transmitted from the radar antenna. The cosecant input and the synchronous trigger pulse input are applied to a cosecant phantastron whose output is differentiated and passed to an inverter amplifier. The output of the amplifier is fed to a clearance marker blocking oscillator circuit. The output from the blocking oscillator circuit is coupled to a cathode ray oscilloscope type of pilot's indicator to produce a "clearance marker" on the oscilloscope screen as the radar antenna scans in a vertical plane. The output of the cosecant phantastron is also applied, without being differentiated, along with the video signal input, to coincidence circuitry which produces a signal to operate a relay which controls the visual or audible warning signal.

It is a general object of the present invention to provide circuitry for use with a radar system to adapt the radar system to terrain clearance and obstacle warning functions. It is a more specific object of the present invention to provide a circuit which utilizes the input from a radar video circuit and an input from a radar sync trigger circuit with an input representative of the angle between the radar antenna beam and the flight path of the aircraft to produce outputs which provide a terrain clearance marker on an oscilloscope and audible or visual warnings of existence of obstacles in the flight path.

It is another object of the present invention to utilize output from a cosecant potentiometer in producing on an oscilloscope a "clearance marker" representative of an imaginary plane parallel to the flight path of and at a certain level below an aircraft.

Other objects and uses of the present invention may become apparent to the reader when the specification is read and a study is made of the accompanying figures of the drawing in which:

FIGURE 1 illustrates the significance of the cosecant function,

FIGURE 2 is a block diagram of the electrical circuit combination of the invention, and FIGURE 3 is a circuit schematic diagram of the inventive subject matter.

Referring to FIGURE 1, it can be seen that a level L which is H distance below the projected flight path of the aircraft, will always be at a distance R from the aircraft along the antenna boresight line which distance R is proportional to the cosecant of $\theta$. In order to apprise a pilot of the relationship of the projected flight path of his aircraft to the terrain ahead, it is desirable to provide an oscilloscope presentation which as the antenna scans in a vertical plane, not only shows radar echo returns from terrain and obstacles ahead of the aircraft, but also shows a marker indicative of a level below the aircraft. The present invention makes possible the use of a voltage representative of the cosecant of $\theta$ to produce such a marker, hereafter called the "clearance marker." This cosecant voltage may be produced by any of the various means known to those skilled in the art. Typically, such means could include a cosecant potentiometer coupled to the antenna scanning mechanism so that as the antenna moves up and down the potentiometer is changed simultaneously. Normally, means are provided in the coupling so that as the angle of attack of the aircraft wing changes, antenna scanning is adjusted in the aircraft so that $\theta$ (hereinafter called the depression angle) continues to represent the angle between the antenna boresight line, and the flight path (velocity vector orientation) of the aircraft.

Referring to FIGURE 2, synchronous triggering pulses are applied by way of conductor 71 to a cosecant delay phantastron circuit represented by block 11. The cosecant delay phantastron circuit 11 also has an input from a cosecant potentiometer 40 for the variable voltage representative of the cosecant of the depression angle of the radar antenna with respect to the flight path of the aircraft. The cosecant delay phantastron circuit 11 has a phantastron cathode follower coupled thereto as represented by block 14. This cathode follower allows the phantastron to be operated with exceedingly short recovery time intervals. For each synchronous triggering pulse received the cosecant delay phantastron 11 produces an output delay gating pulse which is applied by way of conductor 79 to a video coincidence gate amplifier circuit represented by block 16, and another pulse passed by way of conductor 78 to a pulse amplifier inverter circuit represented by block 18 via differentiating circuit 15.

The output of the pulse amplifier inverter 18 is applied to a clearance marker blocking oscillator represented by the block 20. The output of the clearance marker blocking oscillator 20 is applied to a cathode ray oscilloscope type indicator 67 for displaying a clearance marker on the fluorescent face thereof as will be described more fully hereinafter.

Another input applied to the video coincidence gate amplifier circuit 16 is a video signal from the radar sight of an obstacle, applied over conductor 81 through a video amplifier represented by a block 26. The output of the video coincidence gate amplifier is conducted through a D.C. restorer circuit represented by the block 23 the output of which is fed to a D.C. amplifier and relay control circuit represented by block 29. The output conductor of the relay control circuit 29 is coupled to warning relay 110, which controls a warning signal device 111 to produce either a visible or an audible signal to the pilot.

Referring to FIGURE 3, the cosecant delay phantastron 11 includes the pentode 43 and its surrounding circuitry. Synchronous triggering pulses obtained from the aircraft radar and which may be illustrated as positive pulses shown by reference character A, are applied to conductor 71. A variable voltage representative of the cosecant of the depression angle of the radar with respect to the flight path of the aircraft comes by way of the conductor 41 from the cosecant potentiometer 40. This voltage will vary whenever the radar depression angle varies.

When the sync trigger is applied over conductor 71 to capacitor 72, this capacitor cannot change rapidly through resistors 74 and 76 and the potential at the junction of diode 75 and resistor 74 swings positive until it is equivalent to the potential at the junction of diode 75 and resistor 76. When this happens, diode 75 conducts and couples the positive pulse to the suppressor grid of pentode 43 the bias on which is normally set so low by potentiometer 73 that anode current cannot flow. Application of this positive pulse permits pentode 43 to draw anode current from the anode voltage source 45, which results in a sharp decrease in the screen current which prior thereto had been relatively large due to the positive potential supply through resistor 44 from source 45 and the approximately zero voltage on the control grid. The consequence is a sharp potential rise at the screen and a very sharp potential drop at the anode of the tube. This sudden drop in the anode potential is coupled back to the control grid of the tube by means of the phantastron cathode follower triode 50 and the RC circuit consisting of capacitor 51, potentiometer 52, and resistor 49. This decreases the cathode current, which in turn diminishes the screen current to near zero initiating a large positive square wave at the screen which is coupled by capacitor 48 to the suppressor. This wave is represented by reference character C, and is the useful output of the phantastron as explained hereinafter. The cathode follower permits operation of the phantastron with exceedingly short recovery time intervals. The control grid of the tube 43 tends to swing positive due to changing of capacitor 51 through potentiometer 52 and resistor 49. Potentiometer 52 is adjusted so that the rate at which capacitor 51 charges is sufficient to cause the grid to pentode 43 to swing slowly positive allowing more anode current to flow, thereby producing a negative swing at the anode that is linear with respect to time. This process continues until the anode current reaches saturation. When the anode voltage ceases to fall, the grid potential begins to rise exponentially, increasing the cathode current and permitting screen current to flow. Capacitor 51 charges through the control grid, and the screen current returns very quickly to its initial value. This causes the screen potential to fall sharply. This sudden decrease in the screen potential is coupled to the suppressor grid by means of capacitor 48. This negative swing of the suppressor grid constitutes the trailing edge of the square wave and is sufficient to cut the anode current off so that the anode voltage rises. The circuit will remain in this state until the arrival of another sync trigger pulse.

In the above sequence of events, it should be noted that after the initial drop, the anode potential falls linearly with respect to time, and inasmuch as the trailing edge of the square wave is determined when anode current reaches saturation, the pulse width of the suppressor square wave is dependent upon the initial anode potential. The initial anode potential is equal to the input from the cosecant potentiometer on conductor 41, applied through clamping diode 42, which input is proportional to the slant range (R in FIG. 1) along the antenna boresight line to a selected level below the aircraft. The selected level, determined by initial anode potential, can be changed by, for example, changing current through potentiometer 40 through the use of potentiometers 38 and 39 having the resistance elements thereof coupled in series from a positive voltage source 46 and a zero or ground potential on conductor 70. The slope of the voltage sweep at the anode of pentode 43 is adjusted by means of potentiometer 52 so that the pulse width of the square wave output from the suppressor can be made equal to the time required for a radar RF energy pulse to travel to and be reflected back to the aircraft from a target located at the above slant range. This potentiometer is obviously useful to compensate for any instability or changed characteristics of phantastron circuit.

The square wave output on the suppressor is clipped by diode 47 and coupled via conductors 77 and 78 through capacitor 53 to the control grid of pulse amplifier inverter triode 54. The RC components 76 and 53 of the coupling circuitry constitute the differentiator circuit 15 and serve to differentiate the square wave and produce on the grid of triode 54 a wave represented by reference character D. This tube is normally conducting very heavily and is actually drawing grid current. Since the square wave output from the phantastron circuit 11 is positive, the leading edge of the differentiated form does not affect the output from triode 54. When the leading edge arrives at capacitor 53, the capacitor charges very rapidly by means of the grid current through triode 54 and the output at the anode of the tube is not changed. When the trailing edge of the square wave passes, due to differentiation, the grid of the tube is driven negative with respect to the cathode and the anode current is momentarily interrupted, producing a positive output at the anode of the tube. This output is coupled by means of the RC circuit consisting of capacitor 55 and resistor 56 to the control grid of section 59A of the clearance marker blocking oscillator dual triode 59. Triode 59 comprises an input circuit to the blocking oscillator and is normally biased below cutoff by the divider network consisting of resistors 64 and 57, connected between the source 112 of negative potential and ground 70. The resistor 57 has a capacitor 58 in parallel therewith to maintain a direct current bias potential at the junction of resistors 56 and 57 for the grid of tube section 59A. The positive output from triode 54 is sufficient to overcome the bias on section 59A and it conducts. Anode current from section 59A flows through primary winding 62 of the blocking oscillator transformer 61. Capacitor 60 has one plate coupled to the primary winding 62 and the other plate coupled to ground to provide the capacitive component of a filter to prevent voltage transients and spikes from the blocking oscillator from feeding back through the anode resistor to the preceding circuit elements. The output from the secondary winding 63 of the transformer is coupled to the control grid of section 59B. This tube conducts and also supplies current to the transformer primary. Operation of this circuit is typical of other blocking oscillator circuits. After it its triggered, the anode current rises very rapidly to saturation after which the direction of the output from the transformer is reversed and the tube is driven to cutoff. This results in a sharp positive pulse at the cathode of section 59B developed across the resistance element of the potentiometer 65. This output is in time coincidence with the trailing edge of the square wave output from the suppressor circuit of pentode 43 and is taken from the adjustable tap of potentiometer 65 and applied over conductor 66 to the indicator assembly 67 to produce the terrain clearance marker on the fluorescent screen thereof as shown by the line designated by reference character 69. The potentiometer 65 adjusts the amplitude of the blocking oscillator output which affects the brightness of the terrain clearance marker 69. The elapsed time between the sync trigger and the output from section 59B will vary from a short time at the maximum antenna depression angle to a comparatively long time at the minimum antenna depression angle.

To summarize the operation of this portion of the circuit of the invention it can be said that the synchronous triggering pulse input and the input from a cosecant potentiometer are mixed in the pentode 43 of the phantastron, which produces a suppressor grid voltage waveform having as its leading edge the synchronous triggering pulse and a trailing edge varying in accordance with the variable voltage (i.e., the cosecant of the depression angle) applied to the anode of 43 from the conductor 41. This suppressor grid voltage is differentiated by the resistor 76 and the capacitor 53 to produce a positive pulse at the leading edge and a negative-going pulse at the trailing edge of the suppressor grid voltage waveform. The positive-going pulse on conductor 78 is inoperative on tride 54 since this triode is normally conducting, but the negative-going pulse is operative on 54 to cut off the conduction of this tube, thereby producing a positive pulse on the anode to be applied through capacitor 55 to the clearance marker blocking oscillator triode 59. The unblocking of triode 59 produces conduction across resistor 65 where a signal is taken from the movable tap thereof over conductor 66 to the indicator 67. Each pulse produces a pip on the indicator 67. A succession of pulses scribes the clearance marker line 69 as the radar antenna sweeps through the antenna depression angle, the vertical deflection circuitry of the indicator deflecting the beam in proportion to the depression angle by any of the suitable means known in the art. The indicator 67 is an "E scope" so the antenna depression angle is the ordinate co-ordinate and the range is the abscissa co-ordinate. The line 68 represents the projected flight path of the aircraft and the space between lines 68 and 69 represents the desired clearance channel.

To produce the visual or audible warning signal when an obstacle or hazard exists in the flight path or protrudes above a safe level below the aircraft, warning video represented by reference character B and which is obtained from radar circuitry not a part of this invention is coupled from conductor 81 through capacitor 82 to the control grid of section 84A of the video amplifier inverter dual triode 84. Section 84A is a class A amplifier. It is cathode biased by resistor 92 and grid biased through resistor 83. Capacitor 93 shunts resistor 92 and prevents excessive degenerative feedback. The output from the section 84A is a sharp negative pulse that is coupled via capacitor 85 to the control grid of section 84B. Section 84B is at approximately zero grid bias and is normally conducting. The negative pulse from section 84A momentarily interrupts the anode current producing a relatively large positive pulse at the anode of section 84B.

The output 87 from section 84B is coupled through capacitor 86 to the suppressor grid of video coincidence gate amplifier pentode 94. The suppressor grid of 94 is negative biased by the circuit consisting of resistors 89 and 91, and potentiometer 90, and will not permit anode current to flow. A diode 88 is in parallel with the resistor 89 to limit the bias on the grid of tube 94 to negative voltage. Since capacitor 86 must charge through resistor 89, the suppressor is driven positive by the output from section 84B and anode current will flow providing the control grid is not biased below cutoff. Because the control grid is biased through resistance 80 by the suppressor potential over conductor 79 from pentode 43 in the phantastron circuit, pentode 94 is biased below cutoff except during the time interval that the square wave output from pentode 43, hereinafter called the delay gating pulse, is applied.

If the warning video is received during the time that the delay gating pulse from pentode 43 exists on the control grid of pentode 94, anode current will flow in pentode 94, producing a negative swing at the anode. The screen grid of tube 94 is biased from the voltage source at 46 through the resistor 96. The potential of the pentode 94 anode is applied to capacitor 97 but inasmuch as it charges very rapidly through diode 98, negligible effect is produced on the succeeding circuitry coupled by the conductor 95. Very shortly the video pulse passes and the potential at the anode of pentode 94 rises due to D.C. restorer action, to an amplitude proportional to the negative peak-to-peak signal at the anode. Diode 98 is biased in the reverse direction and capacitor 97 cannot charge except through resistor 102 and/or resistor 103. Hence, the potential at the control grid of section 105A of dual triode 105 rises to an amplitude proportional to the negative peak-to-peak signal at the anode. Initially, this tube was biased at or very near to cutoff by the network consisting of resistances 99, 100, 102, and 103, and capacitor 101, anode voltage being supplied from the source 46 through the anode load resistor 104. As the potential on the control grid of section 105A rises, anode current flows, producing a large negative output at the anode. This output is resistively coupled through high impedance resistor 107 to the control grid of section 105B. This is the relay control section and is electrically located in the ground circuit of relay 110 which controls the warning device 111. Normally, section 105B is conducting heavily from the anode voltage supply source 46 through the relay coil 108 and anode conductor 106 through the anode of tube section 105B to maintain relay 110 energized. When the larger negative output from section 105A is applied to the control grid, anode current in the tube is cut off and the relay 110 becomes de-energized, connecting a source 113 of voltage to warning device 111 which may be a lamp or buzzer to indicate the presence of an obstacle reaching above the level represented by the clearance marker. At this time of course a radar video signal derived from the same source in the radar (not shown) as the video input to conductor 81 is also applied through circuitry not a part of this invention to the indicator 67 and illuminates the screen at a point above the clearance marker line 69 on indicator 67 representative of the position of the obstacle producing it. The pilot is therefore warned of the presence and the range from the aircraft of any obstacle present in a channel in which the aircraft is flying having sides defined by the width of radar beam and having a bottom at a selected level (1000 feet for example) below the flight path of the aircraft. Where an obstacle protrudes above the channel bottom level, the warning device will be actuated as the antenna scans vertically through the angle subtended by the obstacle. The size of the angle subtended depends, of course, on how far the obstacle protrudes into the clearance channel and the range of the obstacle from the aircraft. However, if one of these is known, the duration of the actuation of the warning device may be used by the pilot to estimate the other.

To minimize pilot alarms which would otherwise result from receiver noise bursts, potentiometer 100 known as the "warning sensitivity" adjustment can be set to provide D.C. bias just above the system noise level.

The tube section 105B is normally conducting to hold the relay contacts 109 open in all instances where no obstacle appears. The circuitry arranged in this manner offers a "fail safe" operation since the pilot will be warned by the warning signal device 111 at any time there is circuit failure, which would allow the relay contacts to engage even though no obstacle appears in the flight path.

Most satisfactory results are achieved by the present invention when used with a radar system which transmits a rather shallow beam i.e., one whose included angle in the vertical plane is very small.

While the foregoing has presented a preferred embodiment of the present invention, it is intended that the scope be defined in the appended claims.

What is claimed is:

1. A computer comprising: an input for a signal representative of the cosecant of a variable angle; an input for a time reference pulse; means coupled to said inputs for utilizing said signal and reference pulse to produce a gating pulse and to produce an output pulse at a time with respect to said reference pulse which is proportional to said cosecant; indicator means coupled to receive the output pulse of said means for utilizing, for producing a presentation representative of the relation of said proportional time to said variable angle; coincidence circuitry coupled to receive said gating pulse of said means for utilizing and an input for signals representing energy reflections; and a monitor coupled to said coincidence circuitry, whereby said monitor is activated upon concurrence of a gating pulse and a signal representing energy reflections.

2. Obstacle detecting means for a craft having a radar beam scanning through an angle, said means comprising: means for producing a cosecant voltage proportional to the cosecant of said angle between the beam and a reference; pulse generating means coupled to said means for producing a cosecant voltage, said pulse generating means having an input for a synchronizing pulse and producing an output pulse for an indicator, said output pulse having a timed relationshhip to said synchronizing pulse which timed relationship is proportional to said cosecant voltage, and said pulse generating means producing a gating pulse having a duration determined by the cosecant voltage; an indicator coupled to said pulse generating means producing a display according to a succession of said output pulses which is representative of an elevation parallel to said reference; coincidence circuitry coupled to said pulse generating means for receiving said gating pulse and having an input for radar video signals representative of returns from reflecting media in the radar beam; signaling circuitry coupled to said coincidence circuitry for producing a signal upon the coincidence of a radar video signal and said gating pulse whereby obstacles detected give warning on said indicator and give warning by signal from said signaling circuitry.

3. Obstacle warning computer comprising: a source of voltage representing the cosecant function of an angle; means for producing a gating pulse, said means having an input coupled to said source of voltage representing the cosecant function of an angle and an input for a synchronizing pulse; differentiating means coupled to said means for producing a gating pulse; amplifier and inverter means coupled to said differentiating means for amplifying and inverting the output from said differentiating means; blocking oscillator means coupled to said amplifier and inverter means; indicator means coupled to said blocking oscillator means for indicating obstacle clearance from a succession of output pulses from said blocking oscillator means; video coincidence gate amplifier coupled to said means for producing a gating pulse; video amplifier means coupling an input for radar video signals to said video coincidence gate amplifier; a direct current restorer circuit coupled to said video coincidence gate amplifier; amplifier and control means coupled to said direct current restorer circuit; a relay coupled to said amplifier and control means; and a warning device coupled to said relay whereby said warning device is actuated by concurrence of a gating pulse and radar video signal.

4. Obstacle warning computer comprising: a phantastron to produce a gating pulse having a leading and trailing edge, said phantastron having a first input coupled to a source of voltage representing the cosecant function of an angle, and said phantastron having a second input for receiving synchronizing pulses; a cathode follower circuit coupled to said phantastron to permit quick phantastron recovery; differentiating means coupled to said phantastron to receive said gating pulse to produce a differentiated gating pulse; amplifier and inverter means coupled to said differentiating means and responsive to the trailing edge of said gating pulse for amplifying and inverting the differentiated gating pulse at the trailing edge; blocking oscillator means coupled to said amplifier and inverter means for producing an output pulse in response to the trailing edge of said amplified and inverted pulse; indicator means coupled to said blocking oscillator means for presenting a display according to a succession of output pulses impressed thereon by said blocking oscillator means; a video coincidence gate amplifier coupled to said phantastron to receive said gating pulses; video amplifier means coupled to said video coincidence gate amplifier to receive video input signals and amplify them for application to said video coincidence gate amplifier to produce pulses corresponding to coincidence of said video and gating pulses; a direct current restorer circuit coupled to said video coincidence gate amplifier for restoring the coincidence gating amplifier to a constant voltage state; amplifier and control means coupled to said direct current restorer circuit; a relay means coupled to said amplifier and control means to maintain energization of said relay in the constant voltage state between coincidence pulses; and a warning device coupled to said relay whereby said warning device is actuated by said coincidence pulses produced from said gating pulses and video input signals.

5. The computer of claim 4 wherein the source of voltage representing the cosecant function includes a cosecant potentiometer and means for adjusting current therethrough.

6. The computer of claim 5 wherein the phantastron includes a pentode having an anode coupled through a diode for clamping to the potential of the cosecant potentiometer, and having a control grid with an adjustable bias.

7. The computer of claim 6 wherein the relay means is normally in closed circuit relation and is coupled to said amplifier and control means to de-energize said relay upon application of pulses corresponding to coincidence such that failure in said computer causes constant actuation of said warning device.

8. The computer of claim 7 wherein the indicator means is an E-scope.

References Cited by the Examiner

UNITED STATES PATENTS 2,822,537  2/58  Bartelink _____ 343—11

CHESTER L. JUSTUS, *Primary Examiner.*

FREDERICK M. STRADER, *Examiner.*